US012692329B2

(12) United States Patent
Vielhaber et al.

(10) Patent No.: US 12,692,329 B2
(45) Date of Patent: Jul. 28, 2026

(54) FUNCTIONALIZED HYDROGENATED POLYMERS

(71) Applicant: G-3 Chickadee Purchaser, LLC, Akron, OH (US)

(72) Inventors: Margaret Flook Vielhaber, Kent, OH (US); Thomas Franklin Spilker, Broadview Heights, OH (US)

(73) Assignee: G-3 CHICKADEE PURCHASER, LLC, Akron, OH (US)

( * ) Notice: Subject to any disclaimer, the term of this patent is extended or adjusted under 35 U.S.C. 154(b) by 699 days.

(21) Appl. No.: 18/155,835

(22) Filed: Jan. 18, 2023

(65) Prior Publication Data

US 2023/0312780 A1 Oct. 5, 2023

Related U.S. Application Data

(60) Provisional application No. 63/362,212, filed on Mar. 31, 2022.

(51) Int. Cl.

*C08F 36/06* (2006.01)
*C08K 3/04* (2006.01)
*C08K 3/36* (2006.01)

(52) U.S. Cl.

CPC ................ *C08F 36/06* (2013.01); *C08K 3/04* (2013.01); *C08K 3/36* (2013.01)

(58) Field of Classification Search

CPC .............. C08F 36/06; C08K 3/36; C08K 3/04
USPC .......................................................... 524/575
See application file for complete search history.

(56) References Cited

U.S. PATENT DOCUMENTS

| | | | |
|---|---|---|---|
| 5,395,891 A | 3/1995 | Obrecht et al. | |
| 5,672,639 A | 9/1997 | Corvasce et al. | |
| 6,127,488 A | 10/2000 | Obrecht et al. | |
| 6,133,364 A | 10/2000 | Obrecht et al. | |
| 6,207,757 B1 | 3/2001 | Obrecht et al. | |
| 6,242,534 B1 | 6/2001 | Obrecht et al. | |
| 6,372,857 B1 | 4/2002 | Obrecht et al. | |
| 6,608,125 B2 | 8/2003 | Cruse et al. | |
| 9,109,073 B1 * | 8/2015 | Ma | C08L 7/00 |
| 9,790,289 B1 | 10/2017 | Ma et al. | |
| 10,961,327 B2 | 3/2021 | Adachi et al. | |
| 11,208,518 B2 | 12/2021 | Ma | |
| 2003/0130535 A1 | 7/2003 | Deschler et al. | |
| 2019/0010313 A1 * | 1/2019 | Yamashiro | B60C 1/0016 |
| 2021/0162806 A1 | 6/2021 | Chen et al. | |

OTHER PUBLICATIONS

Frohlich et al., The effect of filler-filler and filler-elastomer interaction on rubber reinforcement, Composites: Part A 36, 2005, pp. 449-460.

* cited by examiner

*Primary Examiner* — Deve V Hall
(74) *Attorney, Agent, or Firm* — Jackson Walker LLP; Leisa Talbert Peschel

(57) ABSTRACT

A hydrogenated functionalized polymer comprises a functionalized polydiene that is selectively hydrogenated to achieve a predetermined level of saturation along at least the polydiene portion of the functionalized polydiene. The functionalized polydiene is a reaction product of 1) a living anionic elastomeric polymer initiated with a functional or nonfunctional initiator and 2) a functional polymerization terminator. In one embodiment, the living anionic elastomeric polymer is initiated with a functional initiator of formula AYLi in which Y is a divalent polymer radical; Li is a lithium atom bonded to a carbon atom of Y; and A is an amine-containing radical having the formula (X)

(X)

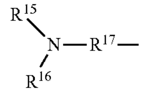

The functionalized polydiene is also a reaction product of a diene monomer and a polymerization terminator of formula (I):

(I)

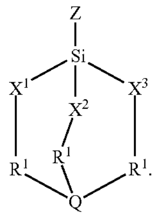

10 Claims, No Drawings

FUNCTIONALIZED HYDROGENATED POLYMERS

FIELD OF THE INVENTION

The disclosure relates to functionalized rubbery polymers that are selectively saturated by hydrogenation. It is intended for use in rubber applications, such as for tires, and will be described with particular reference thereto. However, it is appreciated that the present exemplary embodiments are also amenable to other like applications.

BACKGROUND OF THE INVENTION

Most rubber polymers are derived from a conjugated diene and contain unsaturation points along the hydrocarbon polymer chain for crosslinking. Over time, a cured rubber can suffer degradation caused by light, oxygen (ozone), and heat exposure. The ozone attacks double bonds in the rubber chains, thus accelerating aging. As aging occurs, physical properties change in the cured rubber product.

Additives, such as antiozonants, are widely used to protect rubber against ozone deterioration. To work effectively, they must possess characteristics that allow them to migrate to the rubber surface where they act as a barrier. Alternative approaches are desired in which an additive is not required. Thus, a saturated polymer is proposed to improve aging in cured rubber products.

However, a rubber compound must continue to perform to its desired specifications. Longevity cannot be improved to the detriment of performance. Using tires as an illustrative article, tread formulations that contain silica filler exhibit a number of important performance advantages over those that use carbon black. In tread formulations, the silica is believed to (a) lower rolling resistance, (b) provide better traction on snow, and (c) lower noise generation, when compared with conventional tires filled with carbon black. Therefore, a polymer is desired that provides better aging while maintaining strong compatibility with silica filler.

SUMMARY OF THE INVENTION

The present disclosure provides a low-cost means for generating a polymer that can be incorporated in the manufacture of rubber products, such as tires, when better aging and performance is desired.

One embodiment of the disclosure is directed to a hydrogenated functionalized polymer, which comprises a functionalized polydiene that is selectively hydrogenated to achieve a predetermined level of saturation along at least the polydiene portion of the functionalized polydiene. The functionalized polydiene is a reaction product of 1) a living anionic elastomeric polymer initiated with a functional initiator and 2) a functional polymerization terminator. In one embodiment, the living anionic elastomeric polymer is initiated with a functional initiator of formula AYLi in which Y is a divalent polymer radical; Li is a lithium atom bonded to a carbon atom of Y; and A is an amine-containing radical having the formula (X)

(X)

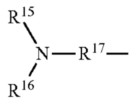

In such embodiment, $R^{15}$ and $R^{16}$ independently have from 1 to 20 carbon atoms and each are independently an alkyl group, a cycloalkyl group, an aromatic group, a substituted alkyl group, a substituted cycloalkyl group or a substituted aromatic group, or $R^{15}$ and $R^{16}$ taken together with the nitrogen to which both $R^{15}$ and $R^{16}$ are attached comprise a heterocyclic amine group wherein $R^{15}$ and $R^{16}$ taken together form an alkanediyl group of from 4 to 20 carbon atoms or a substituted alkanediyl group of from 4 to 20 carbon atoms, and $R^{17}$ is a covalent bond, an alkanediyl group of from 1 to 20 carbon atoms or a substituted alkanediyl group of from 1 to 20 carbon atoms.

The functionalized polydiene is also a reaction product of a diene monomer and a polymerization terminator of formula (I):

(I)

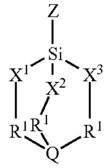

More specifically, the functionalized portion of the hydrogenated functionalized polydiene is derived from the polymerization terminator of formula (1), wherein $R^1$ is C1 to C4 linear alkyl, or C1 to C4 branched alkanediyl; $X^1$, $X^2$, $X^3$ are independently O, S, or a group of formula (II) or (III)

(II)

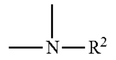

(III)

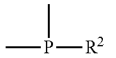

where $R^2$ is C1 to C18 linear or branched alkyl; Z is $R^3$, —$OR^4$, or —$R^5$—$X^4$; $R^3$, $R^4$ are independently C1 to C18 linear or branched alkyl; $R^5$ is C1 to C18 alkanediyl or dialkyl ether diyl; $X^4$ is halogen or a group of structure IV, V, VI, VII or VIII (IV)

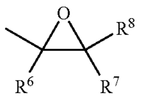

(V)

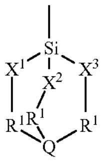

(VI)

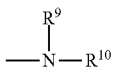

(VII)

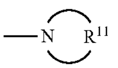

-continued (VIII)

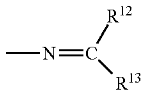

wherein $R^6$, $R^7$, $R^8$, $R^9$, and $R^{10}$ are independently H or C1 to C8 alkyl; $R^{11}$ is C2 to C8 alkanediyl; $R^{12}$ and $R^{13}$ are independently H, aryl or C1 to C8 alkyl;

Q is N or a group of structure IX (IX)

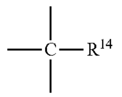

wherein $R^{14}$ is C1 to C8 alkyl.

Another embodiment of the disclosure is directed to a rubber composition comprising the hydrogenated functionalized polydiene, and to a rubber article comprising the rubber composition.

DETAILED DESCRIPTION OF THE INVENTION

The present disclosure is directed to a hydrogenated functionalized polymer that is produced by selectively hydrogenating a functionalized polydiene to generate a predetermined saturation level of the polymer. The hydrogenation of the functionalized polydiene can be performed using methods and catalysts known in the art. Particularly, the final polymer is produced by hydrogenating a functionalized polydiene, although embodiments are contemplated in which the polymer can be produced by functionalizing a saturated polymer.

By "selective" hydrogenation, termination of the hydrogenation reaction is performed after either full or partial conversion of all double bonds in the polydiene portion of the functionalized polymer. In one embodiment, the hydrogenation is terminated when the polydiene portion is from about 10 percent to about 40 percent, or alternatively from about 40 percent to about 80 percent, or alternatively from about 80 percent to about 100 percent, saturated by hydrogenation of the functionalized polymer. In one embodiment, the hydrogenation is terminated when the polymer is from about 10 percent to about 40 percent, or alternatively from about 40 percent to about 80 percent, or alternatively from about 80 percent to about 100 percent, saturated by hydrogenation of the functionalized polymer.

In the contemplated embodiment, the functionalized elastomer disclosed in commonly owned U.S. Pat. No. 9,109,073 is at least partially saturated by hydrogenation. U.S. Pat. No. 9,109,073 discloses a process comprising polymerization using a functional initiator followed by functional termination, the contents of which are fully incorporated herein by reference. Such functionalized elastomer comprises the reaction product of a living anionic elastomeric polymer initiated with a functional initiator is of formula AYLi where Y is a divalent polymer radical, Li is a lithium atom bonded to a carbon atom of Y, and A is an amine-containing radical having the formula X (X)

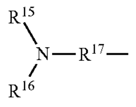

wherein $R^{15}$ and $R^{16}$ independently have from 1 to 20 carbon atoms and each are independently an alkyl group, a cycloalkyl group, an aromatic group, a substituted alkyl group, a substituted cycloalkyl group or a substituted aromatic group, or $R^{15}$ and $R^{16}$ taken together with the nitrogen to which both $R^{15}$ and $R^{16}$ are attached comprise a heterocyclic amine group wherein $R^{15}$ and $R^{16}$ taken together form an alkanediyl group of from 4 to 20 carbon atoms or a substituted alkanediyl group of from 4 to 20 carbon atoms, and $R^{17}$ is a covalent bond, an alkanediyl group of from 1 to 20 carbon atoms or a substituted alkanediyl group of from 1 to 20 carbon atoms.

The functionalized elastomer further comprises the reaction product of a functional polymerization terminator of formula I (I)

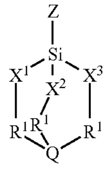

wherein $R^1$ is C1 to C4 linear alkyl, or C1 to C4 branched alkanediyl; $X^1$, $X^2$, $X^3$ are independently O, S, or a group of formula (II) or (III)

(II)

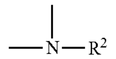

(III)

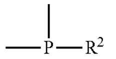

where $R^2$ is C1 to C18 linear or branched alkyl; Z is $R^3$, $—OR^4$, or $—R^5—X^4$; $R^3$, $R^4$ are independently C1 to C18 linear or branched alkyl; $R^5$ is C1 to C18 alkanediyl or dialkyl ether diyl; $X^4$ is halogen or a group of structure IV, V, VI, VII or VIII (IV)

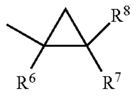

(V)

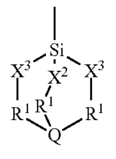

(VI)

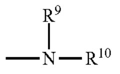

-continued (VII)

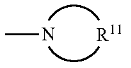

(VIII)

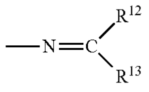

wherein $R^6$, $R^7$, $R^8$, $R^9$, and $R^{10}$ are independently H or C1 to C8 alkyl; $R^{11}$ is C2 to C8 alkanediyl; $R^{12}$ and $R^{13}$ are independently H, aryl or C1 to C8 alkyl; Q is N or a group of structure IX (IX)

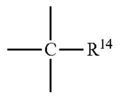

wherein $R^{14}$ is C1 to C8 alkyl.

The end-group bifunctionalization of rubbery living polymers to improve their affinity for fillers, such as carbon black and/or silica, through use of both a functional polymerization initiator and a functional polymerization terminator. The process of the present invention can be used to functionalize any living polymer which is terminated with a metal of group I or II of the periodic table. These polymers can be produced utilizing techniques that are well known to persons skilled in the art. The metal terminated rubbery polymers that can be functionalized with a terminator of formula I in accordance with this invention can be made utilizing monofunctional initiators having the general structural formula P-M, wherein P represents a polymer chain and wherein M represents a metal of group I or II.

The initiator used to initiate the polymerization employed in synthesizing the living rubbery polymer that is functionalized in accordance with this invention is typically selected from the group consisting of barium, lithium, magnesium, sodium, and potassium. Lithium and magnesium are the metals that are most commonly utilized in the synthesis of such metal terminated polymers (living polymers). Normally, lithium initiators are more preferred.

Organolithium compounds are the preferred initiators for utilization in such polymerizations. The organolithium compounds which are utilized as initiators are normally organo monolithium compounds. The organolithium compounds which are preferred as initiators are monofunctional compounds which can be represented by the formula: R—Li, wherein R represents a hydrocarbyl radical. In the present invention, polymerization of a monomer in the presence of the initiator forms a living anionic elastomeric polymer of formula AYLi where Y is a divalent polymer radical, Li is a lithium atom bonded to a carbon atom of Y, and A is an amine-containing radical having the formula X (X)

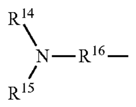

wherein $R^{14}$ and $R^{15}$ independently have from 1 to 20 carbon atoms and each are independently an alkyl group, a cycloalkyl group, an aromatic group, a substituted alkyl group, a substituted cycloalkyl group or a substituted aromatic group, or $R^{14}$ and $R^{15}$ taken together with the nitrogen to which both $R^{14}$ and $R^{15}$ are attached comprise a heterocyclic amine group wherein $R^{14}$ and $R^{15}$ taken together form an alkanediyl group of from 4 to 20 carbon atoms or a substituted alkanediyl group of from 4 to 20 carbon atoms, and $R^{16}$ is a covalent bond, an alkanediyl group of from 1 to 20 carbon atoms or a substituted alkanediyl group of from 1 to 20 carbon atoms. Thus the initiator is of formula R—Li with R replaced by the structure of formula X.

In one embodiment, the organolithium initiator is an N, N-dialkylamino alkyllithium such as 3-(N, N-dimethylamino)-1-propyllithium, 3-(N, N-dimethylamino)-2-methyl-1-propyllithium, 3-(N, N-dimethylamino)-2,2-dimethyl-1-propyllithium, 4-(N, N-dimethylamino)-1-butyllithium, 5-(N, N-dimethylamino)-1-pentyllithium, 6-(N, N-dimethylamino)-1-hexyllithium, 8-(N, N-dimethylamino)-1-propyllithium, and the like. Correspondingly in this embodiment, in formula X the group structure is N, N-dialkylamino alkyl such as 3-(N, N-dimethylamino)-1-propyl, 3-(N, N-dimethylamino)-2-methyl-1-propyl, 3-(N, N-dimethylamino)-2,2-dimethyl-1-propyl, 4-(N, N-dimethylamino)-1-butyl, 5-(N, N-dimethylamino)-1-pentyl, 6-(N, N-dimethylamino)-1-hexyl, 8-(N, N-dimethylamino)-1-propyl, and the like.

In one embodiment, the organolithium initiator is an azacycloalkyl alkyllithium such as 3-piperidino-1-propyllithium, 3-pyrrolidino-1-propyllithium, and the like. Correspondingly in this embodiment, in formula X the group structure is 3-piperidino-1-propyl, 3-pyrrolidino-1-propyl, and the like. In one embodiment, the group is 3-pyrrolidino-1-propyl and the initiator is 3-pyrrolidino-1-propyllithium.

The amount of organolithium initiator utilized will vary depending upon the molecular weight which is desired for the rubbery polymer being synthesized as well as the precise polymerization temperature which will be employed. The precise amount of organolithium compound required to produce a polymer of a desired molecular weight can be easily ascertained by persons skilled in the art. However, as a general rule from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator.

Many types of unsaturated monomers which contain carbon-carbon double bonds can be polymerized into polymers using such metal catalysts. Elastomeric or rubbery polymers can be synthesized by polymerizing diene monomers utilizing this type of metal initiator system. The diene monomers that can be polymerized into synthetic rubbery polymers can be either conjugated or nonconjugated diolefins. Conjugated diolefin monomers containing from 4 to 8 carbon atoms are generally preferred. Vinyl-substituted aromatic monomers can also be copolymerized with one or more diene monomers into rubbery polymers, for example styrene-butadiene rubber (SBR). Some representative examples of conjugated diene monomers that can be polymerized into rubbery polymers include 1,3-butadiene, isoprene, 1,3-pentadiene, 2,3-dimethyl-1,3-butadiene, 2-methyl 1,3-pentadiene, 2,3-dimethyl-1,3-pentadiene, 2-phenyl-1,3-butadiene, and 4,5-diethyl-1,3-octadiene. Some representative examples of vinyl-substituted aromatic monomers that can be utilized in the synthesis of rubbery polymers include styrene, 1-vinylnaphthalene, 3-methyl styrene, 3,5-diethyl styrene, 4-propyl styrene, 2,4,6-trimethylstyrene, 4-dodecyl styrene, 3-methyl-5-normal-hexyl styrene, 4-phenyl styrene, 2-ethyl-4-benzyl styrene, 3,5- diphenyl styrene, 2,3,4,5-tetraethyl styrene, 3-ethyl-1-vinylnaphthalene, 6-isopropyl-1-vinylnaphthalene, 6-cyclohexyl-1-vinylnaphthalene, 7-dodecyl-2-vinylnaphthalene, α-methylstyrene, and the like.

The metal terminated rubbery polymers that are functionalized with a terminator of formula I in accordance with this invention are generally prepared by solution polymerizations that utilize inert organic solvents, such as saturated aliphatic hydrocarbons, aromatic hydrocarbons, or ethers. The solvents used in such solution polymerizations will normally contain from about 4 to about 10 carbon atoms per molecule and will be liquids under the conditions of the polymerization. Some representative examples of suitable organic solvents include pentane, isooctane, cyclohexane, normal-hexane, benzene, toluene, xylene, ethylbenzene, tetrahydrofuran, and the like, alone or in admixture. For instance, the solvent can be a mixture of different hexane isomers. Such solution polymerizations result in the formation of a polymer cement (a highly viscous solution of the polymer).

The metal terminated living rubbery polymers utilized in the practice of this invention can be of virtually any molecular weight. However, the number average molecular weight of the living rubbery polymer will typically be within the range of about 50,000 to about 500,000. It is more typical for such living rubbery polymers to have number average molecular weights within the range of 100,000 to 250,000.

The metal terminated living rubbery polymer can be functionalized by simply adding a stoichiometric amount of a terminator of formula I to a solution of the rubbery polymer (a rubber cement of the living polymer). In other words, approximately one mole of the terminator of formula I is added per mole of terminal metal groups in the living rubbery polymer. The number of moles of metal end groups in such polymers is assumed to be the number of moles of the metal utilized in the initiator. It is, of course, possible to add greater than a stoichiometric amount of the terminator of formula I. However, the utilization of greater amounts is not beneficial to final polymer properties. Nevertheless, in many cases it will be desirable to utilize a slight excess of the terminator of formula I to ensure that at least a stoichiometric amount is actually employed or to control the stoichiometry of the functionalization reaction. In most cases from about 1.2 to about 2 moles of the terminator of formula I will be utilized per mole of metal end groups in the living polymer being treated. In the event that it is not desired to functionalize all of the metal terminated chain ends in a rubbery polymer then, of course, lesser amounts of the terminator of formula I can be utilized.

The terminator of formula I will react with the metal terminated living rubbery polymer over a very wide temperature range. For practical reasons the functionalization of such living rubbery polymers will normally be carried out at a temperature within the range of 0° C. to 150° C. In order to increase reaction rates, in most cases it will be preferred to utilize a temperature within the range of 20° C. to 100° C. with temperatures within the range of 50° C. to 80° C. being most preferred. The capping reaction is very rapid and only very short reaction times within the range of 0.1 to 2 hours are normally required. However, in some cases reaction times of up to about 24 hours may be employed to insure maximum conversions.

In one embodiment, the terminator of formula I has one of the structures shown in Table 1.

TABLE 1

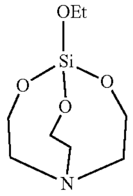

ESTE

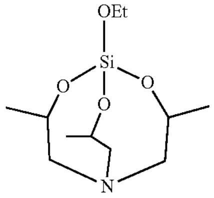

ESTI

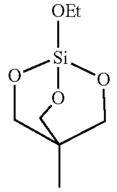

ESTM

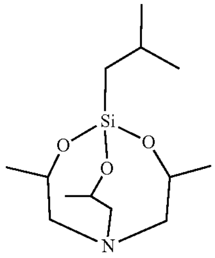

BSTI

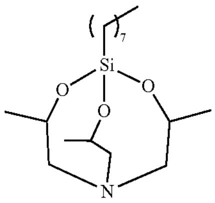

OSTI

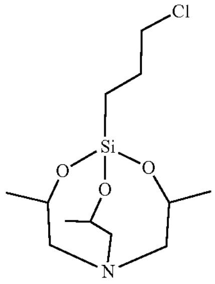

CSTI

TABLE 1-continued

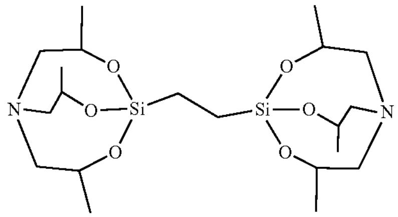

BIPOS

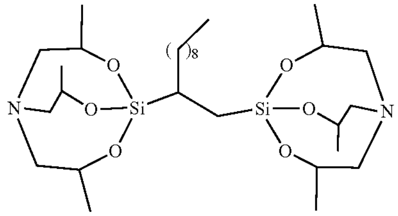

BIDECS

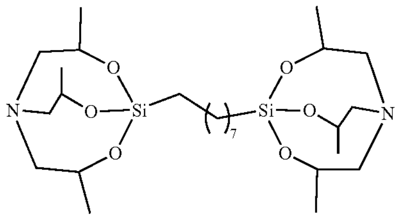

BIOCTS

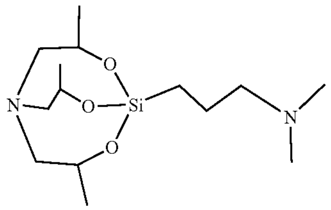

DMASTI

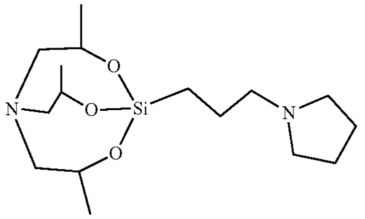

PYSTI

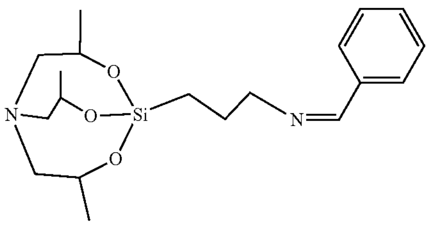

BIMSTI

TABLE 1-continued

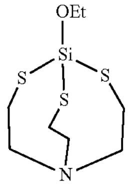

ETTS

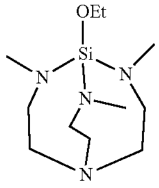

ETAS

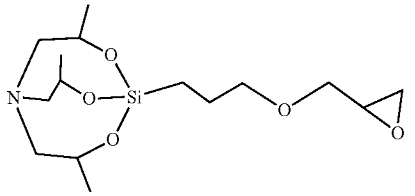

EPTI

ESTE: 1-ethoxy-2,8,9-trioxa-5-aza-1-silabicyclo[3.3.3]undecane, or ethoxysilatrane ESTI: 1-ethoxy-3,7,10-trimethyl-2,8,9-trioxa-5-aza-1-silabicyclo[3.3.3]undecane, or 1-ethoxy-3,7,10-trimethylsilatrane ESTM: 1-ethoxy-4-methyl-2,6,7-trioxa-1-silabicyclo[2.2.2]octane BSTI: 1-isobutyl-3,7,10-trimethyl-2,8,9-trioxa-5-aza-1-silabicyclo[3.3.3]undecane, or 1-isobutyl-3,7,10-trimethylsilatrane OSTI: 1-octyl-3,7,10-trimethyl-2,8,9-trioxa-5-aza-1-silabicyclo[3.3.3]undecane, or 1-octyl-3,7,10-trimethylsilatrane CSTI: 1-(3-chloropropyl)-3,7,10-trimethyl-2,8,9-trioxa-5-aza-1-silabicyclo[3.3.3]undecane, or 1-(3-chloropropyl)-3,7,10-trimethylsilatrane BIPOS: 1,2-bis(3,7,10-trimethyl-2,8,9-trioxa-5-aza-1-silabicyclo[3.3.3]undecan-1-yl)ethane, or 1,2-bis(3,7,10-trimethylsilatrane)ethane BIDECS: 1,1'-(decane-1,2-diyl)bis(3,7,10-trimethyl-2,8,9-trioxa-5-aza-1-silabicyclo[3.3.3]undecane), or 1,1'-(decane-1,2-diyl)bis(3,7,10-trimethylsilatrane)

BIOCTS: 1,8-bis(3,7,10-trimethyl-2,8,9-trioxa-5-aza-1-silabicyclo[3.3.3]undecan-1-yl)octane, or 1,8-bis(3,7,10-trimethylsilatrane)octane DMASTI: N,N-dimethyl-3-(3,7,10-trimethyl-2,8,9-trioxa-5-aza-1-silabicyclo[3.3.3]undecan-1-yl)propan-1-amine PYSTI: 3,7,10-trimethyl-1-(3-(pyrrolidin-1-yl)propyl)-2,8,9-trioxa-5-aza-1-silabicyclo[3.3.3]undecane BIMSTI: N-benzylidene-3-(3,7,10-trimethyl-2,8,9-trioxa-5-aza-1-silabicyclo[3.3.3]undecan-1-yl)propan-1-amine ETTS: 1-ethoxy-2,8,9-trithia-5-aza-1-silabicyclo[3.3.3]undecane; or 1-ethoxy-thiosilitrane ETAS: 1-ethoxy-2,8,9-trimethyl-2,5,8,9-tetraaza-1-silabicyclo[3.3.3]undecane; or 1-ethoxy-2,8,9-triazasilatrane EPTI: 3,7,10-trimethyl-1-(3-(oxiran-2-ylmethoxy)propyl)-2,8,9-trioxa-5-aza-1-silabicyclo[3.3.3]undecane; or 1-(3-(oxiran-2-ylmethoxy)propyl)-3,7,10-trimethylsilatrane The functionalized elastomer may then undergo a hydrogenation reaction to selectively saturate the functionalized elastomer to a desired level. By this reaction, a select amount of double bonds in at least the polydiene rubber portion are converted to single bonds. This reduces the number of unsaturation points that are susceptible to ozone degradation in the final polymer, thus improving aging. The hydrogenation reaction is selectively terminated after full or partial conversion of the double bonds in the polymer.

After the functionalization and hydrogenation reactions are completed, it will normally be desirable to “kill” any living polydiene chains or catalysts which remain. This can be accomplished by adding an alcohol, such as methanol or ethanol, to the polymer cement after the functionalization reaction is completed in order to eliminate any living polymer that was not consumed by the reaction with the terminator of formula I. The end-group functionalized, hydrogenated polydiene rubber can then be recovered from the solution utilizing standard techniques.

The hydrogenated, functionalized polymer may then be compounded into a rubber composition. The rubber composition may optionally include, in addition to the hydrogenated functionalized polymer, one or more rubbers or elastomers containing olefinic unsaturation. The phrases “rubber or elastomer containing olefinic unsaturation” or “diene-based elastomer” are intended to include both natural rubber and its various raw and reclaim forms as well as various synthetic rubbers. In the description of this invention, the terms “rubber” and “elastomer” may be used interchangeably, unless otherwise prescribed. The terms “rubber composition,” “compounded rubber” and “rubber compound” are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene-based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene-based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term “phr” as used herein, and according to conventional practice, refers to “parts by weight of a respective material per 100 parts by weight of rubber, or elastomer.”

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products and British Standard* 2000 *Parts,* 2003, 62nd edition, published by the Institute of Petroleum, United Kingdom.

The rubber composition may include from about 10 to about 165 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 $cm^3/100$ g.

Other fillers may be used in the rubber composition including, but not limited to, particulate fillers including ultra-high molecular weight polyethylene (UHMWPE), crosslinked particulate polymer gels including but not limited to those disclosed in U.S. Pat. No. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)—S—CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Pat. No. 6,849,754. In one embodiment, the sulfur containing organosilicon compound is Si-363®, obtained from Evonik.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Up to 60 phr of resin(s) can be used. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber articles including, but not limited, components of a tire, coated metal, coated wire, coated cord, hoses, belts, and shoe soles. For example, an example rubber tire component may be a tread (including tread cap and tread base), sidewall, apex, chafer, sidewall insert, wirecoat or innerliner. In one embodiment, the component is a tread. In a tread, the disclosed hydrogenated functionalized polymer has better aging and is contemplated to maintain or improve performance, via an improved polymer-filler interaction among other properties. In tire tread compounds this can result in lower polymer hysteresis which in turn can provide a lower level of tire rolling resistance.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A hydrogenated functionalized polymer comprising:

a functionalized polydiene being selectively hydrogenated to a predetermined level of saturation along a polydiene portion of the functionalized polydiene, wherein the functionalized polydiene is a reaction product of a living anionic elastomeric polymer terminated with a silatrane and optionally initiated with an amine or a nonfunctional initiator; and the predetermined level is from about 40 percent to about 80 percent saturated by hydrogenation.

2. The polymer of claim 1, wherein the amine is a functional initiator of formula AYLi, wherein Y is a divalent polymer radical; Li is a lithium atom bonded to a carbon atom of Y; and A is an amine-containing radical having the formula (X)

(X)

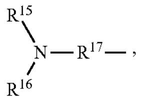

wherein $R^{15}$ and $R^{16}$ independently have from 1 to 20 carbon atoms and each are independently an alkyl group, a cycloalkyl group, an aromatic group, a substituted alkyl group, a substituted cycloalkyl group or a substituted aromatic group, or $R^{15}$ and $R^{16}$ taken together with the nitrogen to which both $R^{15}$ and $R^{16}$ are attached comprise a heterocyclic amine group wherein $R^{15}$ and $R^{16}$ taken together form an alkanediyl group of from 4 to 20 carbon atoms or a substituted alkanediyl group of from 4 to 20 carbon atoms, and $R^{17}$ is a covalent bond, an alkanediyl group of from 1 to 20 carbon atoms or a substituted alkanediyl group of from 1 to 20 carbon atoms.

3. The polymer of claim 1, wherein the silatrane is a polymerization terminator of formula (I):

(I)

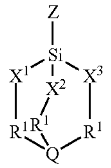

wherein $R^1$ is C1 to C4 linear alkyl, or C1 to C4 branched alkanediyl; $X^1$, $X^2$, $X^3$ are independently O, S, or a group of formula (II) or (III)

(II)

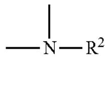

(III)

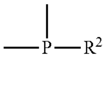

where $R^2$ is C1 to C18 linear or branched alkyl; Z is $R^3$, —$OR^4$, or —$R^5$—$X^4$; $R^3$, $R^4$ are independently C1 to C18 linear or branched alkyl; $R^5$ is C1 to C18 alkanediyl or dialkyl ether diyl;

$X^4$ is halogen or a group of structure IV, V, VI, VII or VIII (IV)

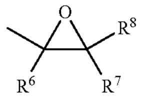

(V)

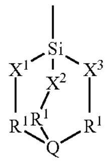

(VI)

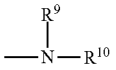

(VII)

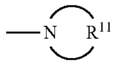

(VIII)

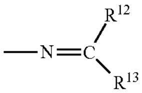

wherein $R^6$, $R^7$, $R^8$, $R^9$, and $R^{10}$ are independently H or C1 to C8 alkyl; $R^{11}$ is C2 to C8 alkanediyl;

$R^{12}$ and $R^{13}$ are independently H, aryl or C1 to C8 alkyl;

Q is N or a group of structure IX (IX)

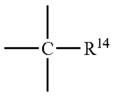

wherein $R^{14}$ is C1 to C8 alkyl.

4. The polymer of claim 1, wherein the polymerization terminator of formula I is selected from the group consisting of the following structures

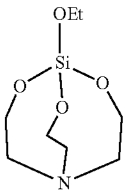

ESTE

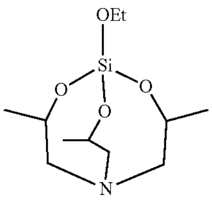

ESTI

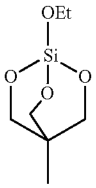

ESTM

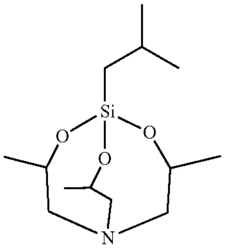

BSTI

-continued

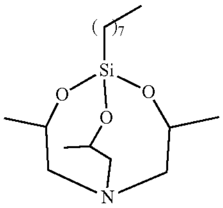

OSTI

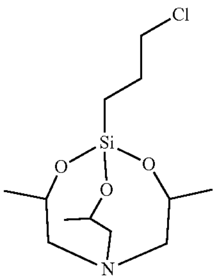

CSTI

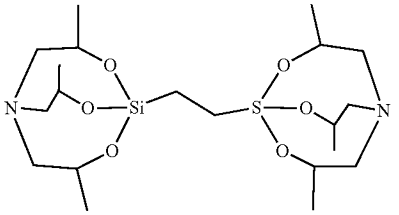

BIPOS

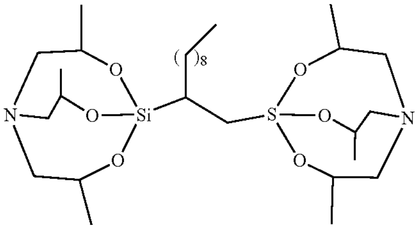

BIDECS

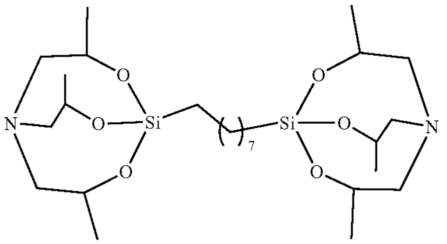

BIOCTS

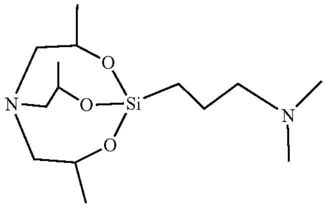

DMASTI

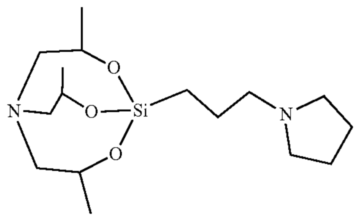

PYSTI

-continued

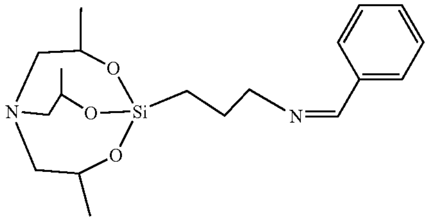

BIMSTI

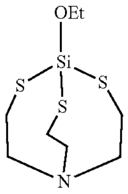

ETTS

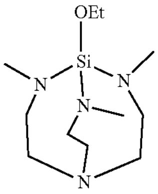

ETAS

-continued

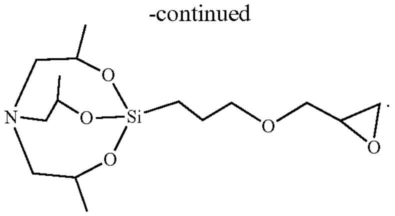

EPTI

5. The polymer of claim 1, wherein the living anionic elastomer is derived from at least one diene monomer and optionally at least one vinyl aromatic monomer.

6. The polymer of claim 1, wherein the living anionic elastomer is derived from at least one of isoprene and butadiene, and optionally from styrene.

7. The polymer of claim 1, wherein the living anionic elastomer is derived from butadiene and styrene.

8. The polymer of claim 1, wherein $R^1$ is a C1 to C4 branched alkanediyl; and Q is N; and Z is $R^3$.

9. The polymer of claim 1, wherein the polymer is incorporated in a rubber composition further comprising silica and/or carbon black.

10. The polymer of claim 1, wherein the polymer is incorporated in one of a rubber tire, hose, belt, and shoe.

* * * * *